(12) United States Patent
Baca et al.

(10) Patent No.: US 7,933,114 B2
(45) Date of Patent: Apr. 26, 2011

(54) COMPOSITE CARBON ELECTRODES USEFUL IN ELECTRIC DOUBLE LAYER CAPACITORS AND CAPACITIVE DEIONIZATION AND METHODS OF MAKING THE SAME

(75) Inventors: Adra Smith Baca, Pittsford, NY (US); Roy Joseph Bourcier, Corning, NY (US); Todd P St Clair, Painted Post, NY (US); Prantik Mazumder, Ithaca, NY (US); Andrew R Nadjadi, Canisteo, NY (US); Vitor Marino Schneider, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 666 days.

(21) Appl. No.: 11/848,637

(22) Filed: Aug. 31, 2007

(65) Prior Publication Data

US 2009/0305138 A1 Dec. 10, 2009

(51) Int. Cl.
*H01G 9/00* (2006.01)
(52) U.S. Cl. ........ 361/502; 361/311; 361/313; 361/503; 361/303; 361/512
(58) Field of Classification Search .......... 361/502, 361/503–504, 509–512, 523–528, 321.1, 361/321.2
See application file for complete search history.

(56) References Cited

U.S. PATENT DOCUMENTS

| | | | |
|---|---|---|---|
| 5,443,859 A | 8/1995 | Nagata | 427/122 |
| 5,636,437 A | 6/1997 | Kaschmitter et al. | 29/825 |
| 5,776,633 A | 7/1998 | Mrotek et al. | 429/218 |
| 5,932,185 A | 8/1999 | Pekala et al. | 423/445 R |
| 6,096,179 A * | 8/2000 | Fajt et al. | 204/294 |
| 6,214,204 B1 | 4/2001 | Gadkaree et al. | 205/758 |
| 6,713,034 B2 | 3/2004 | Nakamura et al. | 423/447.2 |
| 6,778,378 B1 | 8/2004 | Andelman | 361/302 |
| 6,979,513 B2 | 12/2005 | Kelley et al. | 429/121 |
| 7,061,749 B2 * | 6/2006 | Liu et al. | 361/502 |
| 7,116,546 B2 * | 10/2006 | Chow et al. | 361/508 |
| 7,227,737 B2 * | 6/2007 | Mitchell et al. | 361/502 |
| 7,312,976 B2 * | 12/2007 | Kazaryan et al. | 361/502 |
| 2005/0207962 A1 | 9/2005 | Dietz et al. | 423/445 |
| 2007/0154779 A1 | 7/2007 | Ko et al. | 429/44 |

FOREIGN PATENT DOCUMENTS

| | | |
|---|---|---|
| EP | 0608539 | 8/1993 |
| EP | 1049116 | 11/2000 |
| WO | WO95/06002 | 3/1995 |
| WO | WO01/15792 | 3/2001 |

OTHER PUBLICATIONS

Tassin et al; "Effects of Three-Dimensional Current Collectors on Supercapacitors' Characteristics"; Journal of Power Sources 65 (1997) 61-64.
Park et al; "Electrical Properties and Shrinkage of Carbonized Photoresist Films and the Implications for Carbon Microelectromechanical Systems Devices in Conductive Media"; Journal of the Electrochemical Society, 152 (12) J136-J143 (2005).
Corning Incorporated U.S. Appl. No. 11/799,901 entitled "Layered Carbon Electrodes for Capacitive Deionization and Methods of Making the Same".
Corning Incorporated U.S. Appl. No. 11/807,981 entitled "Layered Carbon Electrodes Useful in Electric Double Layer Capacitors and Capacitive Deionization and Methods of Making the Same".

* cited by examiner

*Primary Examiner* — Nguyen T Ha
(74) *Attorney, Agent, or Firm* — Tina N. Thompson

(57) ABSTRACT

Composite carbon electrodes for use in, for example, Capacitive Deionization (CDI) of a fluid stream or, for example, an electric double layer capacitor (EDLC) are described. Methods of making the composite carbon electrodes are also described. The composite carbon electrode comprises an electrically conductive porous matrix comprising carbon; and an electric double layer capacitor, comprising an activated carbonized material, dispersed throughout the pore volume of the electrically conductive porous matrix.

6 Claims, 4 Drawing Sheets

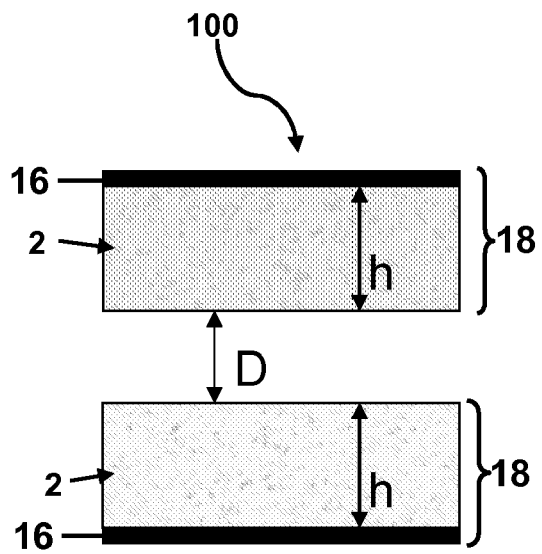
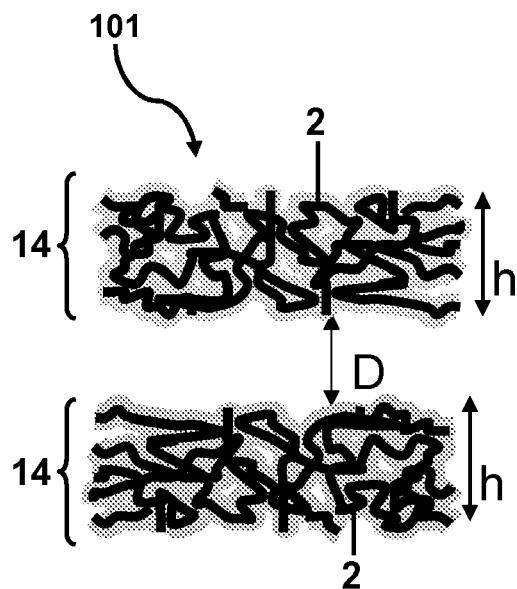
Figure 1a
Figure 1b
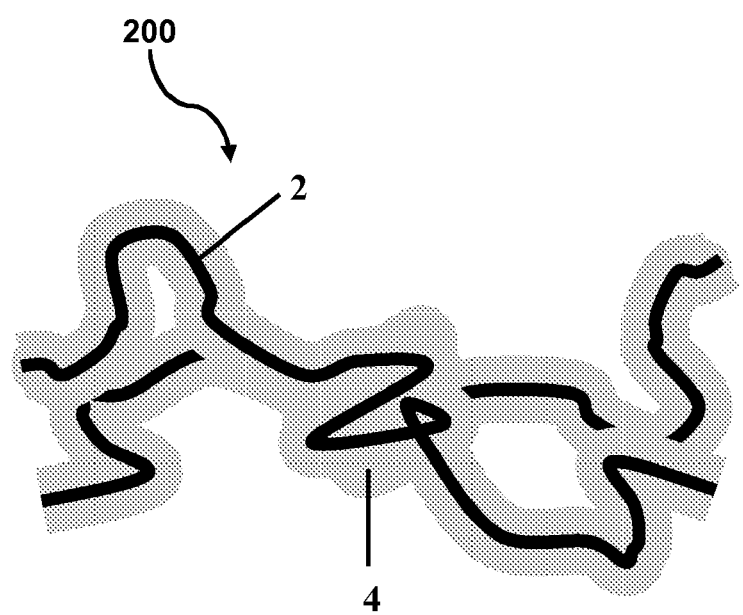
Figure 2

COMPOSITE CARBON ELECTRODES USEFUL IN ELECTRIC DOUBLE LAYER CAPACITORS AND CAPACITIVE DEIONIZATION AND METHODS OF MAKING THE SAME

BACKGROUND

1. Field of the Invention

The present invention relates generally to composite electrodes and more particularly to a composite carbon electrode useful for electric double layer capacitors and/or for capacitive deionization and methods of making the same.

2. Technical Background

An electric double layer capacitor (EDLC) is an example of a capacitor that typically contains porous carbon electrodes (separated via a porous separator), current collectors and an electrolyte solution. When electric potential is applied to an EDLC cell, ionic current flows due to the attraction of anions to the positive electrode and cations to the negative electrode. Electric charge is stored in the electric double layer (EDL) formed along the interface between each polarized electrode and the electrolyte solution.

EDLC designs vary depending on application and can include, for example, standard jelly roll designs, prismatic designs, honeycomb designs, hybrid designs or other designs known in the art. The energy density and the specific power of an EDLC can be affected by the properties thereof, including the electrode and the electrolyte utilized. With respect to the electrode, high surface area carbons, carbon nanotubes, activated carbon and other forms of carbon and composites have been utilized in manufacturing such devices. Of these, carbon based electrodes are used in commercially available devices.

Capacitive Deionization (CDI) is a promising technology, for instance, for the purification of water. In this context, positively and negatively charged electrodes are used to attract ions from a stream or bath of fluid. The ions form electric double layers on the surfaces of the electrodes, which are fabricated from some form of high surface area material, for example, a form of activated carbon. After interaction with the electrodes during the charging period, the fluid contains a lower overall ion content and is discharged. A volume of purge fluid is then introduced to the electrodes. The electrodes are then electrically discharged, thus releasing the trapped ions into the purge fluid. The purge fluid is then diverted into a waste stream and the process repeated.

In U.S. Pat. No. 6,778,378, electrodes are described which are fabricated by blending activated carbon powder, fibrillated polytetrafluoroethylene (PTFE) and a liquid, forming a paste-like material. The resulting paste-like material is then rolled into a composite sheet. Electrodes formed in this fashion are thin, flexible sheets with good specific capacitance. A large fraction of this capacitance value is a result of the activated carbon used.

However, the particle to particle connectivity of the carbon particles in the activated carbon is typically poor and these electrodes have high electronic resistance compared to the monolithic aerogel electrodes. A separate current collector sheet, typically made of rolled exfoliated graphite material, is clamped to the electrode back surface with a large compressive force to obtain the necessary electrical performance, thus increasing the cost and the complexity of a CDI device made using these electrodes. Also these rolled composite sheets, due to the purely mechanical nature of the PTFE/carbon bonding, have only modest erosion resistance. For this reason, when eliminating particulates from the fluid stream, the flow rates of the fluid stream need to be minimized across the surface of these electrodes.

In U.S. Pat. No. 5,636,437, CDI electrodes are described which are fabricated from a slurry of carbon powder in a polymer binder. High surface area carbon powder is mixed with a carbonizable polymer liquid to form a paste-like material. The resulting paste-like material is then applied to an electrically conductive porous substrate. The polymer liquid is cured and carbonized, creating an all-carbon electrode where the high surface area particles are embedded within the carbonized polymer. The utility of the activated carbon powder is compromised in this design as a result of the activated carbon powder being embedded within the carbonized polymer matrix.

In U.S. Pat. No. 5,776,633, electrodes are described in which discrete activated carbon fibers or a piece of activated carbon fiber cloth is coated with a mixture of carbonizable polymer and an activated carbon powder. The carbonizable polymer is cured and carbonized, creating an all-carbon electrode where the high surface area activated carbon particles are embedded within the carbonized polymer. The utility of the activated carbon powder is compromised in this design as a result of being embedded within the carbonized polymer matrix.

In U.S. Pat. No. 5,932,185, electrodes are described which are fabricated by coating carbon paper with a carbon foam. Carbon paper sheets are soaked with a polymer resin sol and then pyrolyzed. Supercritical drying is traditionally used to obtain an aerogel structure prior to pyrolysis. The resulting electrodes are thin, monolithic carbon structures. The aerogel surface of these electrode sheets and the carbon paper itself are delicate and need to be protected from mechanical stressing. The resulting electrodes exhibit good CDI performance, but are extremely costly. Limited success has been achieved at applying subcritical drying to reduce cost. Also, these electrodes possess a very modest level of total capacitance per unit area, as the aerogel layer is thin and of limited surface area. This increases the number of electrode sheets required for a given system, further increasing the cost.

A flow-through (rather than parallel plate) flow geometry is described in commonly owned U.S. Pat. No. 6,214,204, the disclosure of which is incorporated herein by reference in its entirety. In this reference, monolithic, low back pressure porous electrodes are made by one of several methods, which include honeycomb extrusion, casting or molding from a phenolic resin-based batch. After curing, these parts are carbonized and activated to create high surface area carbon monoliths with good electrical conductivity.

The resulting electrodes may exhibit limited mechanical strength, in certain embodiments, since the electrodes may comprise a porous and brittle material. Thus, manufacturing thin, large diameter electrodes for high performance is challenging and packaging the electrodes into a CDI system is also challenging. Also, because they do not have a conductive graphitic backplane, their electronic conductivity is low as compared to the carbon paper-based aerogel electrodes.

Commonly owned U.S. patent application Ser. No. 11/799,901, the disclosure of which is incorporated by reference in its entirety, describes layered carbon electrodes for use in, for example, Capacitive Deionization (CDI) of a fluid stream or, for example, an electric double layer capacitor (EDLC). Methods of making the layered carbon electrodes are also described. The layered carbon electrode comprises an electrically conductive porous layer and an adjacent layer comprising carbon particles in contact with the electrically conductive porous layer. A thermoplastic material is infused in the electrically conductive porous layer and provides a bond to the carbon particles at the interface of the electrically conductive porous layer and the adjacent layer comprising carbon particles.

Commonly owned U.S. patent application Ser. No. 11/807, 981, the disclosure of which is incorporated by reference in its entirety, describes carbon electrodes for use in, for example, Capacitive Deionization (CDI) of a fluid stream or, for example, an electric double layer capacitor (EDLC). Methods of making the carbon electrodes are also described. The carbon electrode comprises an electrically conductive porous carbon support and a carbon cover layer comprising carbon particles in contact with the electrically conductive porous carbon support. A carbonizable material is within the electrically conductive porous carbon support and provides a bond to the carbon particles at the interface of the electrically conductive porous carbon support and the carbon cover layer. The electrically conductive porous support in some embodiments is a layered structure, where one of the layers is a carbonizable paste layer having electrically conductive particles mixed therein.

The layered carbon electrodes, described above, have increased electrical conductivity as compared to many conventional electrodes, in part, due to the integrated electrical backplane provided by the electrically conductive porous layer. The layered carbon electrodes possess increased capacitive performance, resulting from highly effective utilization of the carbon particles.

U.S. Pat. No. 5,443,859 describes a method of manufacturing high conductivity carbonized films made from a polyimide.

Several types of photoresists are described in the Journal of Electrochemical Society, 152 (12), pp. J136-J143 (2005) for the manufacturing of carbonized films with high conductivity. A process for the manufacturing of carbonized films from photoresists such as PMMA and SU-8 is described for micromechanical systems.

It would be advantageous to develop cost-effective, electrochemically inert and mechanically robust carbon electrodes, including increased erosion resistance, with high specific capacitance and low electrical resistance. Also, it would be advantageous for the carbon electrodes to be easily processed into different geometries which could enable various fluidic schemes.

SUMMARY

Composite carbon electrodes useful for electric double layer capacitors (EDLC) and for capacitive deionization and methods of making the same are described herein. The composite carbon electrodes and the methods of making the composite carbon electrodes of the present invention as described herein, address one or more of the above-mentioned disadvantages of the conventional electrodes.

In one embodiment, a carbon electrode is described. The carbon electrode comprises, in a single layer, an electrically conductive porous matrix comprising carbon; and an electric double layer capacitor, comprising an activated carbonized material, dispersed throughout the pore volume of the electrically conductive porous matrix.

According to another embodiment, a method of making a composite carbon electrode is described. The method comprises providing an electrically conductive porous matrix comprising carbon, infusing the electrically conductive porous matrix with a carbonizable material, curing the carbonizable material, carbonizing the carbonizable material, and activating the carbonized material to form the composite carbon electrode.

According to another embodiment, a method of making a composite carbon electrode is described. The method comprises providing an electrically conductive porous matrix comprising carbon, infusing the electrically conductive porous matrix with a carbonizable material, curing the carbonizable material, carbonizing the carbonizable material to form an electrically conductive porous matrix infused with the carbonized material, infusing the electrically conductive porous matrix infused with the carbonized material with a carbonizable material, curing the carbonizable material, and carbonizing the carbonizable material.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that both the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification. The drawings illustrate one or more embodiment(s) of the invention and together with the description serve to explain the principles and operation of the invention.

BRIEF DESCRIPTION OF THE DRAWINGS

The invention can be understood from the following detailed description either alone or together with the accompanying drawing figures.

FIG. 1a is an illustration of a conventional EDLC electrode pair.

FIG. 1b is an illustration of an integrated EDLC electrode pair comprising composite carbon electrodes according to the present invention.

FIG. 2 is an illustration of an element of a composite carbon electrode according to one embodiment.

DETAILED DESCRIPTION

Figure 3A:
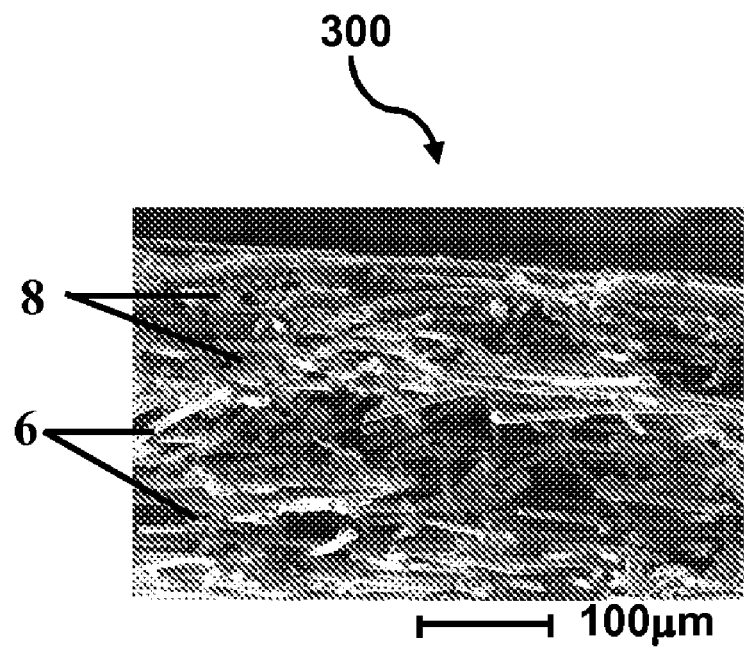
FIG. 3A is a scanning electron microscope (SEM) image of a cross section of a commercially available Toray carbon paper.

Reference will now be made in detail to various embodiments of the invention, examples of which are illustrated in the accompanying drawings. Wherever possible, the same reference numbers will be used throughout the drawings to refer to the same or like parts.

Conventional EDLC electrodes comprising an electrical backplane and a capacitive layer have been improved by the present invention, in part, by integrating the electrically conductive porous matrix and the electric double layer capacitor, comprising an activated carbonized material into a single layer.

FIG. 1a is an illustration of a conventional EDLC electrode pair 100. FIG. 1b is an illustration of an integrated EDLC electrode pair 101 comprising composite carbon electrodes 14 according to the present invention.

In both configurations, as shown in FIG. 1a and FIG. 1b, the thickness of each electrode is shown by arrow h, and the gap between two adjacent electrodes is shown by arrow D. In the conventional EDLC electrode, the planar backplane 16 serves as a planar current-collector and is attached to the back-side of each electrode 18. In the integrated EDLC electrode pair 101, the planar backplane of the conventional electrode is replaced by an electrically conductive porous matrix 2 that is distributed throughout the volume occupied by the composite carbon electrode 14, as shown in FIG. 1b.

The electrically conductive porous matrix thus serves as a current-collector; however, the electrically conductive porous matrix is integrated within the electrode volume instead of being attached to the back face of the electrodes as in the conventional EDLC electrodes. According to the present invention, the electric double layer capacitor is the porous matrix distributed along the electrically conductive porous matrix.

The resulting composite carbon electrode has excellent conductivity. The electrically conductive porous matrix has a rigid structure amenable to packaging, is erosion resistant, and has exhibited increased device capacitance in testing where aqueous solutions of NaCl were used as the electrolyte.

An advantage of incorporating the electrically conductive porous matrix into the composite carbon electrodes, according to the present invention is that the incorporation of the electrically conductive porous matrix provides two capacitive interfaces per electrode in a stack configuration (multiple positive and negative electrodes alternately stacked) as opposed to one capacitive interface per electrode in a conventional EDLC electrode stack configuration. This leads to a much faster charging and discharging characteristic of the integrated EDLC electrode stack of present invention as compared to conventional EDLC electrode stacks having backplanes.

In a conventional EDLC electrode stack, the positively charged ions penetrate the cathode through the capacitive surface (the surface of one electrode facing an adjacent electrode of opposite polarity) under the influence of the electrode field between the two adjacent electrodes. Since the planar backplane of the conventional EDLC electrode is impervious to mass flux, there is only one capacitive interface per conventional capacitive EDLC electrode even in stack configuration (multiple electrodes of opposite polarity stacked alternately).

Hence, in the conventional EDLC electrode, the resistance, R, is proportional to the thickness of the electrode, h. The capacitance, C, of the electrode is proportional to the mass of the electrode and thus proportional to the thickness of the electrode. The characteristic time scale for charging and discharging, the RC constant, is proportional to the square of the thickness, $h^2$.

The integrated EDLC comprising composite carbon electrodes provides two capacitive interfaces per electrode. Both surfaces of one electrode are now pervious to mass flux and ions can penetrate the electrode from both sides. Therefore, each electrode has an effective thickness of h/2 and the RC constant is proportional to $h^2/4$. This provides faster charging of the composite carbon electrodes according to the present invention as compared to conventional EDLC electrodes in a stack configuration.

Several conventional materials currently used in the art also have one or more of the following disadvantages: the materials either aggressively corrode or dissolve under electrical potential in saltwater or the materials are prohibitively expensive. The application of corrosion-resistant coatings to more reactive conductive materials does not seem practical, given the extremely aggressive nature of the mixed-ion saltwater capacitive deionization environment.

In one embodiment, as shown in FIG. 2, the element of the carbon electrode 200 comprises, in a single layer, an electrically conductive porous matrix 2 comprising carbon; and an electric double layer capacitor 4, comprising an activated carbonized material, dispersed throughout the pore volume of the electrically conductive porous matrix.

The mechanical framework for the composite carbon electrode of the present invention is the electrically conductive porous matrix; which acts as a distributed current collector into which the electric double layer capacitor, the active capacitor element, is dispersed and supported, thus, providing mechanical integrity to the composite carbon electrode. It is advantageous that the electrically conductive porous matrix comprises a material that is electrically conductive and electrochemically inert.

Unfortunately, carbon is a modest electrical conductor in the best of cases. However, carbon possesses a high degree of electrochemical stability when used in a CDI environment, for example, in a fluid containing salt (NaCl).

Fortunately, the electrical resistivity of carbon is sufficiently low as compared to the effective ionic resistivity of the electrolyte solution in the porous electrode as well as in the gap between adjacent electrodes, thus rendering the materials utilized by the present invention, for example, carbon, advantageous.

According to one embodiment, the electrically conductive porous matrix comprises graphite, carbon paper, carbon fibers, synthetic fiber carbon felt, carbon foam, carbon cloth or combinations thereof, which materials themselves may be porous or nonporous.

The porosity of the electrically conductive porous matrix should be high enough that a sufficient loading of activated carbonized material can be achieved, leading to a reasonable device capacitance as well. The porosity of the electrically conductive porous matrix should not be so high, though, that the overall conductivity of the electrically conductive porous matrix is unacceptably low.

A reasonable target for resistance is a through-plane resistivity of <100 mΩ·cm. Furthermore, the electrically conductive porous matrix should be rigid enough that the final composite carbon electrode has sufficient flatness and stiffness that the final composite carbon electrode can be packaged into, for example, a CDI cell or a CDI system.

More specifically, the final composite carbon electrode should be able to withstand compressive forces necessary to make electrical connections in, for example, a CDI cell or a CDI system.

In some embodiments, it is advantageous that the final composite carbon electrode is substantially flat such that insulating spacers of a similar dimension can be printed, molded, or adhesively bonded on the surface or through the final composite carbon electrode in discrete areas of the final composite carbon electrode.

According to one embodiment, the electrically conductive porous matrix is a carbon fiber-based paper, for example, carbon fiber-based paper derived from graphitizable polyacrylonitrile (PAN)-based fibers. For example, a commercially available PAN-based paper available from Toray Marketing and Sales, 461 Fifth Ave., 9th Fl., New York, N.Y. has a porosity of ~80% and a through-plane resistivity of 80 mΩ·cm. The manufacturer's specifications for various Toray paper thicknesses are shown in Table 1.

TABLE 1

| Properties | Unit | TGP-H-030 | TGP-H-060 | TGP-H-090 | TGP-120 |
|---|---|---|---|---|---|
| Thickness | μm | 0.11 | 0.19 | 0.28 | 0.37 |
| Bulk density | g/cm$^3$ | 0.46 | 0.44 | 0.44 | 0.45 |
| Porosity | % | 80 | 78 | 78 | 78 |
| Surface roughness Ra | μm | 8 | 8 | 8 | 8 |
| Gas permeability | ml · mm/ (cm$^2$ · hr · mmAq) | 2500 | 1900 | 1700 | 1500 |
| Electrical resistivity | | | | | |
| through plane | mΩcm | 80 | 80 | 80 | 80 |
| in plane | mΩcm | — | 5.3 | 5.6 | 4.7 |
| Thermal conductivity | | | | | |
| through plane (room temp.) | W/(m · k) | — | (1.7) | (1.7) | (1.7) |
| inplane (room temp.) | W/(m · k) | — | 21 | 21 | 21 |
| inplane (100° C.) | W/(m · k) | — | 23 | 23 | 23 |
| Coefficient of thermal expansion | | | | | |
| in plane (25-100° C.) | ×10$^{-6}$/° C. | 0.8 | 0.8 | 0.8 | 0.8 |
| Flexural strength | MPa | 40 | 40 | 40 | 40 |
| Flexural modulus | GPa | 8 | 10 | 10 | 10 |
| Tensile strength | N/cm | — | 50 | 70 | 90 |

*The above data are experimental values and are not guaranteed

An SEM image of a cross section of an exemplary electrically conductive porous matrix 300 is shown in FIG. 3A. The electrically conductive porous matrix, in this embodiment, is a carbon fiber-based paper available from Toray. The carbon fiber-based paper comprises carbon fibers 6 and carbonized resin 8.

According to another embodiment, a synthetic fiber carbon felt can be used as the electrically conductive porous matrix. This material could provide a cost reduction to the manufacturing of the composite carbon electrodes when compared to the costly PAN fiber based carbon paper.

The electrically conductive porous matrix, according to other embodiments, can comprise a planar sheet which is, for example, 50 to 500 microns in thickness or 150 to 400 microns in thickness.

According to another embodiment, carbon foam, for example PocoFoam available from Poco Graphite, Inc. can be used as the electrically conductive porous matrix.

According to one embodiment, the activated carbonized material comprises an activated carbonized form of a material selected from a phenol formaldehyde resole, a photoresist, a polyamide, a phenol formaldehyde novolac, a polyimide, a phenolic resin, an epoxy, a petroleum pitch, a synthetic pitch and combinations thereof.

Figure 4:
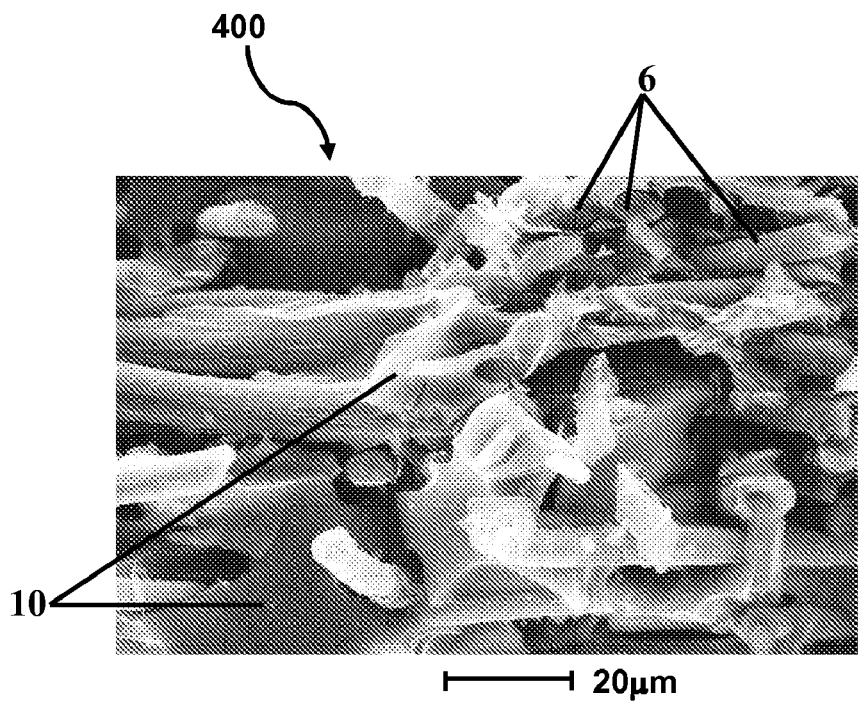
FIG. 4 is an SEM image of a cross section of a composite carbon electrode according to one embodiment.

An SEM image of a cross section of features 400 of a carbon electrode, according to one embodiment is shown in FIG. 4. The carbon electrode, in this embodiment comprises, in a single layer, an electrically conductive porous matrix comprising carbon fibers 6; and an electric double layer capacitor, comprising an activated carbonized material 10, dispersed throughout the pore volume of the electrically conductive porous matrix. In this embodiment, the activated carbonized material is an activated carbonized phenolic resin.

According to another embodiment, a method of making a composite carbon electrode is disclosed. The method comprises providing an electrically conductive porous matrix, infusing the electrically conductive porous matrix with a carbonizable material, curing the carbonizable material, carbonizing the electrically conductive porous matrix and the carbonizable material and activating the carbonized material to form the carbon electrode.

The electric double layer capacitor should be capable of being infused into the electrically conductive porous matrix described above. The electric double layer capacitor can be deposited via liquid or gas phase deposition methods. If liquid phase deposition is used, similar wetting characteristics are desirable, e.g. both the liquid phase and the electrically conductive porous matrix should be similarly hydrophilic or hydrophobic.

Further processing of the deposited phase of the carbonizable material is typically needed in order to generate activated carbons with high surface area. Precursors to activated carbonized material can be categorized according to whether they are graphitizable or not, and whether they will be activated via thermal or chemical methods. Graphitizable carbons provide an opportunity to synthesize a low conductivity EDLC, although maintaining high surface area in the activated carbonized material after being exposed to the high temperatures, for example, 2000° C. to 2800° C., for graphitization can be challenging.

According to one embodiment, a two-step method is described. The method comprises first carbonizing the carbonizable material and then activating the carbonized material via chemical activation in a second step to create the high surface area activated carbonized material for the EDLC. However, most chemical activations require subsequent neutralization and washing steps and can be very process intensive.

According to another embodiment, a less process intensive method is described. The method comprises carbonizing the carbonizable material and activating the carbonized material via physical activation. For example, a non-graphitizable phenolic resin or photoresist precursor is infused into the electrically conductive porous matrix and then carbonized. Subsequently, physical activation using steam or $CO_2$ can create sufficient surface area to create a suitable EDLC. Materials that will produce high carbon content upon carbonization include many cross-linkable resins such as phenolic, epoxy, polyimide, melamine and other thermosetting resins.

Additionally, some thermoplastics such as PAN or pitch can also be used as precursors for the activated carbonized material. Exemplary parameters for material selection include the ratio of the number of carbon-carbon bonds to carbon-heteroatom bonds in the precursors for the activated carbonized material.

In one embodiment, curing is performed in an oven in an air environment. The temperature of the oven is increased in stages from room temperature to the final curing temperature at heating rates of from 6° C. to 15° C. per hour.

According to another embodiment, the oven initially can be held at a temperature greater than room temperature but less than the curing temperature. The number of stages between room temperature and the final curing temperature can range from 0 to 10, for example, from 0 to 5. The final curing temperature can range from 100° C. to 350° C., for example, 150° C. to 260° C. with hold times varying from 0.25 hours to 10 hours, for example, 0.5 hours to 4 hours. The electrodes are then cooled at a cooling rate of from 1° C. to 50° C., for example, from 6° C. to 15° C. per hour to the gel point of the carbonizable material, for example, in the temperature range of from 100° C. to 225° C., for example, from 120° C. to 160° C. The electrodes are annealed at the gel point for 6 to 24 hours, after which the electrodes are cooled to room temperature at a cooling rate of from 1° C. to 50° C., for example, from 6° C. to 15° C. per hour.

In one embodiment, carbonization is performed in a CM Rapid Temperature retort furnace. The electrodes are heated to the carbonization temperature in an inert, non-oxidizing environment, such as $N_2$ or Ar, using a heating rate of from 20° C. to 100° C. per hour. The gas flow rate ranges from 2.5 to 7.5 liters per min (STP). The carbonization temperature ranges from 800° C. to 1300° C. The electrodes are held at the carbonization temperature for 0.1 hour to 12 hours, for example, for 1 hour to 12 hours and then cooled to room temperature at a cooling rate of from 50° C. to 150° C. per hour.

The carbonizable material should readily wet the electrically conductive porous matrix when applied to the electrically conductive porous matrix. The carbonizable material should wet the electrically conductive porous matrix and infiltrate the pore structure, thus becoming infused in the pore structure of the electrically conductive porous matrix.

In one embodiment, the carbonizable material comprises a material selected from a phenol formaldehyde resole, a photoresist, a polyamide, a phenol formaldehyde novolac, a polyimide, a phenolic resin, an epoxy, a petroleum pitch, a synthetic pitch and combinations thereof.

It is advantageous that the carbonizable material be capable of being carbonized into a monolithic form with good mechanical integrity and that the weight loss upon carbonization is 50% or less. In other embodiments, the weight loss upon carbonization is 30% or less. Weight loss of the carbonizable material greater than 50% upon carbonization may be a source of cracking and microcracking of the carbon electrode, thus reducing mechanical strength and electrical conductivity.

According to another embodiment, the carbonizable material in the carbonized form (i.e. carbonized material) can be graphitic in nature, which can impart a higher electrical conductivity to the carbon electrode.

According to one embodiment, the carbonizable material has a viscosity, when uncured, of from 100 to 20,000 centipoise (cP) at a temperature in the range of from 20° C. to 100° C.

According to another embodiment, the carbonizable material has a viscosity, when uncured, of from 400 to 2000 centipoise (cP) at a temperature in the range of from 20° C. to 40° C.

According to another embodiment, composite carbon electrodes may be bonded together back to back using a polymer adhesive, for example, a low viscosity thermopolymer or a non-conductive porous separation layer, for example, a fabric filter.

Composite two-sided electrodes made in this fashion can possess exceptional mechanical strength. They can readily incorporate an array of punched holes or other designs, which can be used to enable a hybrid parallel/transverse flow through CDI cell design. In one embodiment, the composite carbon electrode comprises a hole extending through the thickness of the electrode. The hole can be, for example, from 1 mm to 10 mm in diameter.

According to one embodiment, activating the carbonized material can be performed in, for example, a CM Rapid Temperature retort furnace. The electrodes which have been cured and carbonized are heated to the activation temperature in an inert, non-oxidizing environment utilizing an inert gas, for example, $N_2$ or Ar using a heating rate of from 125° C. to 250° C. per hour. The inert gas rate ranges from 2.5 to 7.5 liters per min (STP). After reaching the activation temperature, the gas environment is switched to a mildly oxidizing gas such as steam or $CO_2$ at a flow rate of from 0.1 to 4.0 liters per min (STP), for example, from 1.5 to 4.0 liters per min (STP). The electrodes are held at the activation temperature for 0.1 hour to 12 hours, for example, for 1 hour to 12 hours, the gas environment is switched back to inert gas flow rate ranging from 2.5 to 7.5 liters per min (STP) and then the temperature is decreased to room temperature at a cooling rate of from 50° C. to 150° C. per hour.

During the carbonization/activation process, a large number of micropores are formed in the surface of the carbon material. Micropores increase the surface area of the carbon which results in increased capacitance. Other conventional carbons for electrodes may be formed from cured synthetic precursors that are treated with alkali or acids and then further treated at high temperatures to create porosity.

In one embodiment, the application of 70 or more gram-force/square centimeter to 280 or less gram-force/square centimeter to a rigid metal plate placed on top of the electrically conductive porous matrix infused with a carbonizable material is sufficient to obtain the level of flatness for the intended application without causing unnecessary damage to the electrically conductive porous matrix. Damage such as fracturing or micro-cracking of the electrically conductive porous matrix infused with a carbonizable material are examples of such damage.

In another embodiment, a soft, compliant surface on the rigid metal plate could allow distribution of the applied force over the electrically conductive porous matrix infused with a carbonizable material. This in turn should allow the application of higher pressures in some embodiments.

According to another embodiment, a method of making a composite carbon electrode is described. The method comprises providing an electrically conductive porous matrix comprising carbon, infusing the electrically conductive porous matrix with a carbonizable material, curing the carbonizable material, carbonizing the carbonizable material to form an electrically conductive porous matrix infused with the carbonized material, infusing the electrically conductive porous matrix infused with the carbonized material with a carbonizable material, curing the carbonizable material, and carbonizing the carbonizable material.

The steps of infusing, curing and carbonizing can be repeated from 1 to 10 times, according to some embodiments.

nolic resin, a relatively flat material can be obtained. Additionally, annealing under pressure can assist in maintaining a flat shape.

After curing, the carbon paper infused with the carbonizable resin was carbonized at 900° C. for ~6 hours in flowing $N_2$ and then activated in flowing $CO_2$ for 2 hours at 835° C. Table 2 is a summary of the processing weight gains and losses for a representative pair of composite carbon electrodes.

TABLE 2

| Sample | Paper wt./g | After filling with resin/g | Wt. gain due to resin g | Cured weight/g | Weight loss on curing/g | Weight % lost on curing (based on resin wt) | Electrode weight after carbonization | % Carbonization | Carbonized resin weight/g | Weight after activation/g | Activated carbon mass/g | % Activation |
|---|---|---|---|---|---|---|---|---|---|---|---|---|
| 1 | 0.313 | 0.957 | 0.644 | 0.6893 | 0.2677 | 41.57 | 0.5047 | 49.06 | 0.1917 | 0.4789 | 0.1659 | 13.46 |
| 2 | 0.314 | 0.952 | 0.638 | 0.7278 | 0.2242 | 35.14 | 0.5360 | 46.35 | 0.2220 | 0.5087 | 0.1947 | 12.30 |

In another embodiment, the method comprises activating the carbonized material to form the composite carbon electrode utilizing the above described activation process. Activation can be performed after any carbonization step.

Carbon electrodes made according to the above described method are advantageous in that a more continuous EDLC and a higher activated carbon loading (after activation) may be realized due to the multiple infusions of a carbonizable material. The porosity of the resulting carbon electrodes can also be controlled by multiple infusions of a carbonizable material.

Figure 3B:
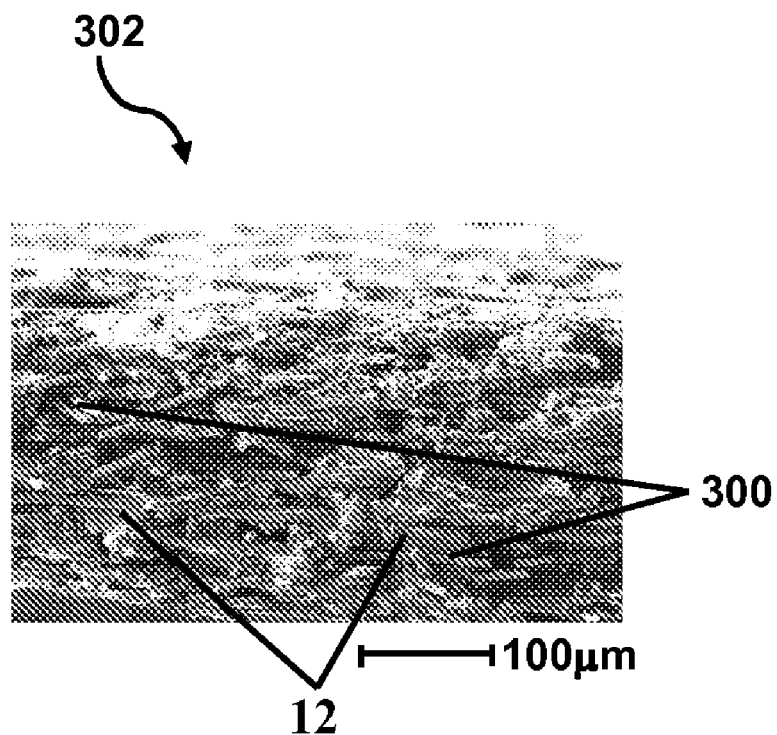
FIG. 3B is an SEM image of a cross section of a commercially available Toray carbon paper infused with a carbonized resin.

An SEM image of a cross section of a carbon electrode 202 is shown in FIG. 3B. The electrically conductive porous matrix 300, in this embodiment, is the carbon fiber-based paper available from Toray shown in FIG. 3A. The carbon electrode, in this embodiment, was made using the multiple infusion, multiple carbonization method described above. As compared to the as purchased carbon fiber-based paper shown in FIG. 3A, the carbon electrode shown in FIG. 3B has a higher density and a lower porosity due in part to the infusions, and in this instance multiple infusions, of the carbonizable material 12.

Example 1

A 1.5"×3" sample of Toray TGP-H-090 PAN-based carbon fiber paper was sectioned. The carbon paper was soaked in a carbonizable phenol-formaldehyde resin until the carbon paper pore volume was filled. The carbonizable resin filled carbon paper was then heated to 150° C. to dry, cure, and cross-link the carbonizable resin.

One aspect of the curing cycle is to hold the electrically conductive porous matrix infused with the carbonizable material at the gel-point of the carbonizable material during the cool down stages of the curing cycle to anneal out any stress built up in the carbonizable material, so that the electrically conductive porous matrix infused with the carbonizable material remains flat once the electrically conductive porous matrix infused with the carbonizable material has reached room temperature.

Figure 5:
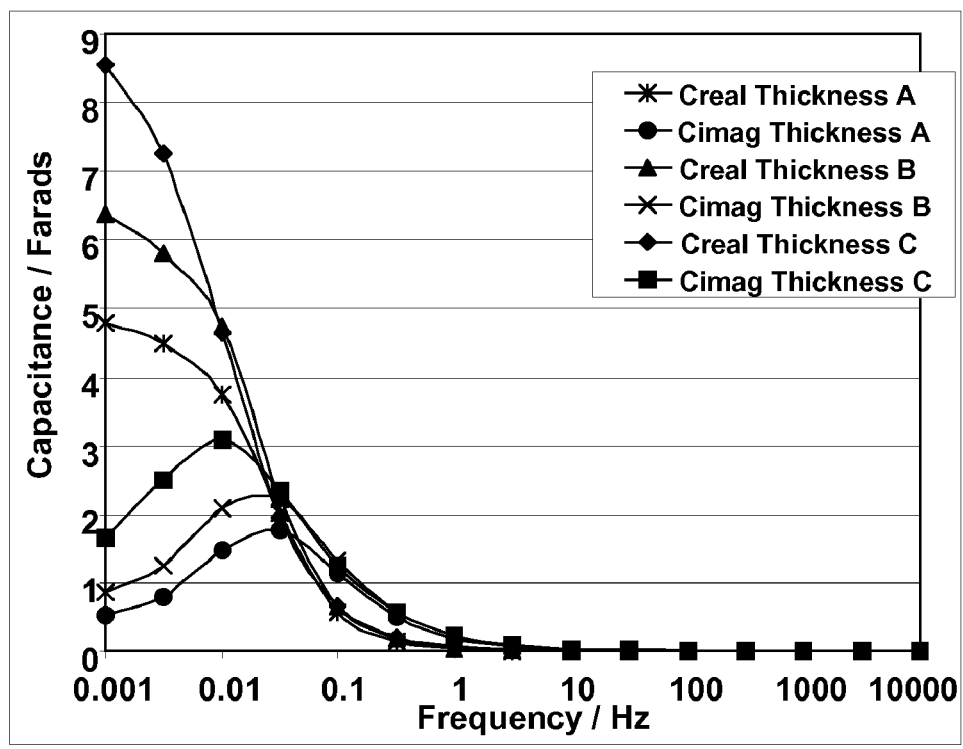
FIG. 5 is a graph showing real and imaginary capacitance as a function of frequency for electrodes of varying thickness according to some embodiments.

In this example, the carbon paper comprises non-woven carbon fibers infiltrated with a carbonizable resin. The residual stresses within the carbon paper based on the non-woven mat, the non-homogeneous resin fill and the thermal processing to produce the carbon, can cause significant deformation in the paper during additional processing steps. By annealing these stresses during the post processing with phe- After activation, a CDI test cell was made by sandwiching a porous fabric (55 µm thick) with electrodes and attaching electrically isolated Grafoil leads to each capacitor. EIS characterization of the composite carbon electrodes to ±10 mV was conducted to determine the device equivalent series resistance (ESR) and capacitance. The results for CDI test cells comprising composite carbon electrodes according to the present invention utilizing different carbon paper thicknesses are shown by the graph in FIG. 5. The EIS characterization was performed using a ±10 mV rms AC excitation that was applied for set frequencies between 10 kHz and 1 mHz.

The capacitance of the CDI test cell increases with increasing carbon paper thickness, and this is a direct result of being able to incorporate more carbonizable resin into the greater absolute pore volume available in thicker carbon paper. Interestingly, even for the thickest paper tested, the CDI test cell does not yet appear to have reached the limit of capacitor thickness that significantly increases the diffusion resistance of the composite carbon electrodes (seen by examining the frequency at which the cross-over occurs between the imaginary and real capacitances for each device).

Figure 6:
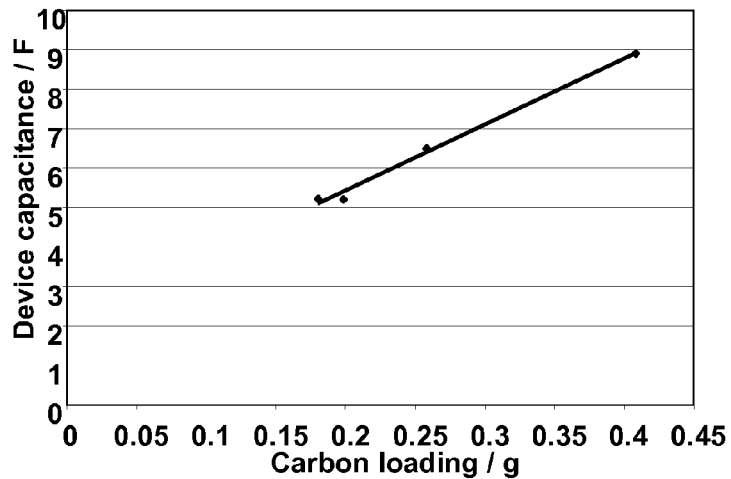
FIG. 6 is a graph showing the correlation between total capacitance as a function of activated carbon loading according to some embodiments.

The graph shown in FIG. 6 compares the total capacitance of the CDI test cells as a function of activated carbon loading. There is a strong correlation between activated carbon mass available in a composite carbon electrode and overall device capacitance.

Example 2

Another materials family useful for EDLC's are those used in the microelectronics industry and can be photosensitive (or not) and easily photo-patterned. One primary candidate for such applications is thick photoresist typically used in micromechanical systems (MEMS) and polyimides (photosensitive or not) used in passivation of microelectronic circuits.

In this example, different types of carbon paper were used to assess the overall resistance and capacitance of a CDI test cell. Samples of 280 µm thick Toray carbon paper and 220 pm thick Spectracarb carbon paper available from Engineered Fibers Technology, 25 Brook Street, Ste. B Shelton, Conn. 06484-3177 were used. A commercially available photoresist, Su-8 (25), was used. The carbon paper was soaked in the photoresist until the pore volume of the carbon paper was saturated. The paper was then heated to 75° C. for 15 minutes in an oven to dry and cure.

According to one embodiment, the photoresist could optionally be photopatterned, according to methods known in the art, leading to cross-linkage of the material and patterning. However, initial results reported here were obtained without photo patterning. After curing, the carbon paper infused with the carbonizable material was carbonized at 1000° C. for ~1 hour in flowing $N_2$ and then activated in flowing $CO_2$ for 2 hours at 835° C.

Figure 7:
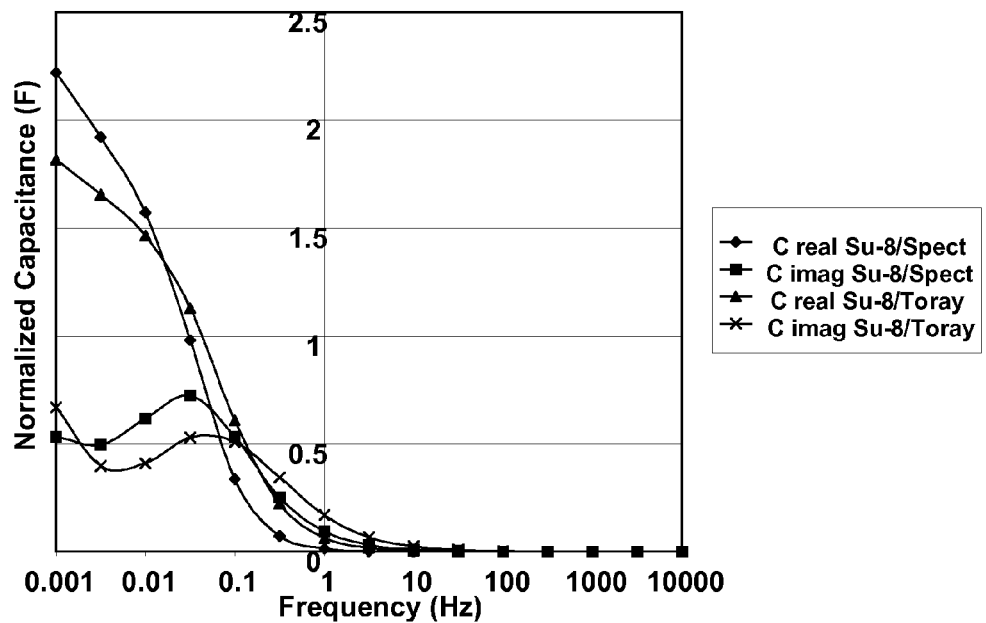
FIG. 7 is a graph showing real and imaginary capacitance as a function of frequency for photoresist-based composite carbon electrodes according to some embodiments.

A CDI test cell was made by sandwiching a porous fabric (55 μm thick) with electrodes and attaching electrically isolated Grafoil leads to each capacitor and characterized with electrochemical impedance spectroscopy (EIS). The capacitance results using 30,000 ppm NaCl solution are shown by the graph in FIG. 7. The CDI test cell displayed a capacitance of more than 2 Farads with a very low ESR. It may be possible to achieve additional performance by multiple coating/carbonization steps and optimization of the activation process for this material.

It should be apparent to one skilled in the art that carbon electrodes of described by the present invention can be produced using a wide range of carbon precursors. It is advantageous for the carbon precursor to be 1) of modest viscosity (to allow infiltration into the carbon paper), 2) crosslinkable (to remain solid and bonded to the paper fibers until carbonization occurs), 3) carbonizable with at least a modest level of electrical conductivity, and 4) amenable to activation through the use of a process which will not degrade the current collector (electrically conductive porous matrix). It is advantageous that the carbon precursor have a high carbon yield on activation, although multiple infusion/carbonization steps may be used.

What is claimed is:

1. A carbon electrode comprising, in a single layer,
   an electrically conductive porous matrix comprising carbon; and
   an electric double layer capacitor, comprising an activated carbonized material, dispersed throughout the pore volume of the electrically conductive porous matrix, wherein the electrically conductive porous matrix is an integrated electrical backplane.

2. The carbon electrode according to claim 1, wherein the electrically conductive matrix comprises graphite, carbon paper, carbon fibers, synthetic fiber carbon felt, carbon foam, carbon cloth or combinations thereof.

3. The carbon electrode according to claim 1, wherein the activated carbonized material comprises an activated carbonized form of a material selected from a phenol formaldehyde resole, a photoresist, a polyamide, a phenol formaldehyde novolac, a polyimide, a phenolic resin, an epoxy, a petroleum pitch, a synthetic pitch and combinations thereof.

4. The carbon electrode according to claim 1, wherein the electrode comprises a hole extending through the thickness of the electrode.

5. The layered carbon electrode according to claim 4, wherein the hole is from 1 mm to 10 mm in diameter.

6. A carbon electrode made by the process according to claim 1.

* * * * *